United States Patent
Dawson et al.

(10) Patent No.: US 11,879,179 B2
(45) Date of Patent: Jan. 23, 2024

(54) HYDROGEN PRODUCTION SYSTEM AND METHOD OF USE

(71) Applicant: Utility Global, Inc., Houston, TX (US)

(72) Inventors: Matthew Dawson, Katy, TX (US); Nicholas Farandos, Bray (IE); Jason Dana, Woodlands, TX (US); Jin Dawson, Katy, TX (US)

(73) Assignee: Utility Global, Inc., Houston, TX (US)

( * ) Notice: Subject to any disclaimer, the term of this patent is extended or adjusted under 35 U.S.C. 154(b) by 27 days.

(21) Appl. No.: 17/692,543

(22) Filed: Mar. 11, 2022

(65) Prior Publication Data

US 2022/0364251 A1 Nov. 17, 2022

Related U.S. Application Data

(60) Provisional application No. 63/183,197, filed on May 3, 2021, provisional application No. 63/183,146, filed on May 3, 2021.

(51) Int. Cl.
*C25B 15/08* (2006.01)
*C01B 3/38* (2006.01)
(Continued)

(52) U.S. Cl.
CPC ............ *C25B 15/08* (2013.01); *C01B 3/382* (2013.01); *C25B 1/042* (2021.01); *C25B 1/23* (2021.01); *C25B 1/50* (2021.01); *C25B 9/23* (2021.01); *C25B 13/07* (2021.01); *C01B 2203/0261* (2013.01); *C01B 2203/1235* (2013.01)

(58) Field of Classification Search
CPC .................................. C25B 1/042; C25B 1/23
See application file for complete search history.

(56) References Cited

U.S. PATENT DOCUMENTS

| 3,635,812 A | 1/1972 | Electric |
| 5,458,857 A | 10/1995 | Collins et al. |

(Continued)

FOREIGN PATENT DOCUMENTS

| CA | 1292618 C | * 12/1991 | ............... C01B 3/32 |
| JP | 2014-069989 A | 4/2014 | |

(Continued)

OTHER PUBLICATIONS

International Search Report and Written Opinion issued for PCT/US2022/019920 dated Jun. 24, 2022, 9 pages.

(Continued)

*Primary Examiner* — Brian W Cohen
(74) *Attorney, Agent, or Firm* — Foley & Lardner LLP

(57) ABSTRACT

Herein discussed is a hydrogen production system comprising: a catalytic partial oxidation (CPOX) reactor; a steam generator; and an electrochemical (EC) reactor; wherein the CPOX reactor product stream is introduced into the EC reactor and the steam generator provides steam to the EC reactor; and wherein the product stream and the steam do not come in contact with each other in the EC reactor. In an embodiment, the EC reactor generates a first product stream comprising CO and $CO_2$ and a second product stream comprising $H_2$ and $H_2O$, wherein the two product streams do not come in contact with each other.

15 Claims, 3 Drawing Sheets

(51) Int. Cl.
      *C25B 1/50*      (2021.01)
      *C25B 1/042*    (2021.01)
      *C25B 13/07*    (2021.01)
      *C25B 9/23*      (2021.01)
      *C25B 1/23*      (2021.01)

(56) References Cited

U.S. PATENT DOCUMENTS

| | | |
|---|---|---|
| 2002/0000066 A1 | 1/2002 | Bentley et al. |
| 2004/0001994 A1 | 1/2004 | Marina et al. |
| 2006/0275205 A1 | 12/2006 | Krist et al. |
| 2006/0280998 A1 | 12/2006 | Ying et al. |
| 2007/0217995 A1* | 9/2007 | Matsumura ............... C25B 1/04 422/162 |
| 2014/0103260 A1 | 4/2014 | Iaquaniello et al. |
| 2020/0255962 A1 | 8/2020 | Hall et al. |

FOREIGN PATENT DOCUMENTS

| | | |
|---|---|---|
| WO | WO-2006/046033 A1 | 5/2006 |
| WO | WO-2013/062415 A1 | 5/2013 |
| WO | WO-2020/146762 A1 | 7/2020 |

OTHER PUBLICATIONS

Deibert, Wendelin et al., Ion conducting ceramic membrane reactors for high-temperature applications, Journal of Membrane Science, Aug. 10, 2017 (Online publication date), vol. 543, pp. 79-97.
International Search Report and Written Opinion for PCT/US2021/065228, dated Apr. 21, 2022, 7 pages.

\* cited by examiner

HYDROGEN PRODUCTION SYSTEM AND METHOD OF USE

CROSS-REFERENCE TO RELATED APPLICATIONS

This application claims the benefit under 35 U.S.C. 119(e) of U.S. Provisional Patent Application Nos. 63/183,197 filed May 3, 2021 and 63/183,146 filed May 3, 2021, the entire disclosures of which are hereby incorporated herein by reference.

TECHNICAL FIELD

This invention generally relates to hydrogen production. More specifically, this invention relates to hydrogen production involving electrochemical pathways.

BACKGROUND

Hydrogen in large quantities is needed in the petroleum and chemical industries. For example, large amounts of hydrogen are used in upgrading fossil fuels and in the production of ammonia or methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy.

The water-gas shift (WGS) reaction describes the reaction of carbon monoxide and water vapor to form carbon dioxide and hydrogen: $CO+H_2O \rightleftharpoons CO_2+H_2$. The reverse water gas shift (RWGS) reaction is the reaction in the reverse direction, i.e., the reaction of carbon dioxide and hydrogen to form carbon monoxide and water. These two reactions, WGS and RWGS, are in equilibrium. The WGS equilibrium reactions are in many applications, such as in the production of ammonia, hydrocarbons, methanol, and hydrogen. It is often used in conjunction with steam reforming of methane and other hydrocarbons. In the Fischer-Tropsch process, the WGS equilibrium reaction is one of the most important reactions used to balance the $H_2/CO$ ratio. In addition, WGS equilibrium reactions have been combined with the gasification of coal to produce hydrogen. Conventionally, WGS reactions are catalyzed by two categories of catalysts—high temperature shift (HTS) catalyst and low temperature shift (LTS) catalyst. The HTS catalyst consists of iron oxide stabilized by chromium oxide; the LTS catalyst is based on copper. To date, WGS equilibrium reactions have been performed chemically.

Contrary to conventional practice, this disclosure discusses an unexpected discovery of WGS reactions performed electrochemically. The electrochemical reactor and the method to perform such reactions are also discussed. In particular, this disclosure includes the discussion of methods and systems for hydrogen production.

SUMMARY

Herein discussed is a hydrogen production system comprising: a catalytic partial oxidation (CPOX) reactor; a steam generator; and an electrochemical (EC) reactor; wherein the CPOX reactor product stream is introduced into the EC reactor and the steam generator provides steam to the EC reactor; and wherein the product stream and the steam do not come in contact with each other in the EC reactor. In an embodiment, the EC reactor generates a first product stream comprising CO and $CO_2$ and a second product stream comprising $H_2$ and $H_2O$, wherein the two product streams do not come in contact with each other. In an embodiment, the system is configured such that a portion of the second product stream is recycled to enter the EC reactor.

In an embodiment, the CPOX reactor utilizes air as the oxidant and optionally wherein the CPOX reactor product stream is directly introduced into the EC reactor with no gas separation. In an embodiment, the system is configured such that at least a portion of the first product stream is recycled to enter the steam generator.

In an embodiment, the CPOX reactor utilizes oxygen as the oxidant and optionally wherein the CPOX reactor product stream is directly introduced into the EC reactor with no gas separation.

In an embodiment, the system is configured such that at least a portion of the first product stream is recycled to the CPOX reactor. In an embodiment, the system is configured such that at least a portion of the first product stream is sent to a carbon capture unit.

In an embodiment, the EC reactor comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. In an embodiment, the membrane is also electronically conductive.

In an embodiment, the EC reactor comprises porous electrodes that comprise metallic phase and ceramic phase, wherein the metallic phase is electronically conductive, and wherein the ceramic phase is ionically conductive. In an embodiment, the EC reactor comprises an anode and a cathode and a catalyst on the anode side, wherein the catalyst promotes chemical reverse water gas shift (RWGS) reactions.

Also discussed herein is a method of producing hydrogen comprising introducing a hydrocarbon into a catalytic partial oxidation (CPOX) reactor to generate a product stream; and providing said product stream and steam to an electrochemical (EC) reactor, wherein the product stream and the steam do not come in contact with each other in the EC reactor.

In an embodiment, the EC reactor comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. In an embodiment, the membrane is also electronically conductive. In an embodiment, the membrane separates the product stream from the steam.

In an embodiment, the EC reactor oxidizes the CPOX reactor product stream in a reducing environment and generates a first product stream comprising CO and $CO_2$; and wherein the EC reactor reduces steam to hydrogen electrochemically and generates a second product stream comprising $H_2$ and $H_2O$. In an embodiment, the membrane separates the first and second product streams. In an embodiment, at least a portion of the second product stream is recycled to enter the EC reactor.

In an embodiment, the CPOX reactor utilizes air as the oxidant and wherein optionally the CPOX reactor product stream enters the EC reactor directly with no gas separation.

In an embodiment, at least a portion of the first product stream is utilized to produce steam from water.

In an embodiment, the CPOX reactor utilizes oxygen as the oxidant and wherein optionally the CPOX reactor product stream enters the EC reactor directly with no gas separation. In an embodiment, at least a portion of the first product stream is recycled to the CPOX reactor and wherein optionally at least a portion of the first product stream is sent to a carbon capture unit to sequester $CO_2$.

In an embodiment, the EC reactor comprises an anode and a cathode and a catalyst on the anode side, wherein the catalyst promotes chemical reverse water gas shift (RWGS) reactions.

Further aspects and embodiments are provided in the following drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Overview

Figure 1:
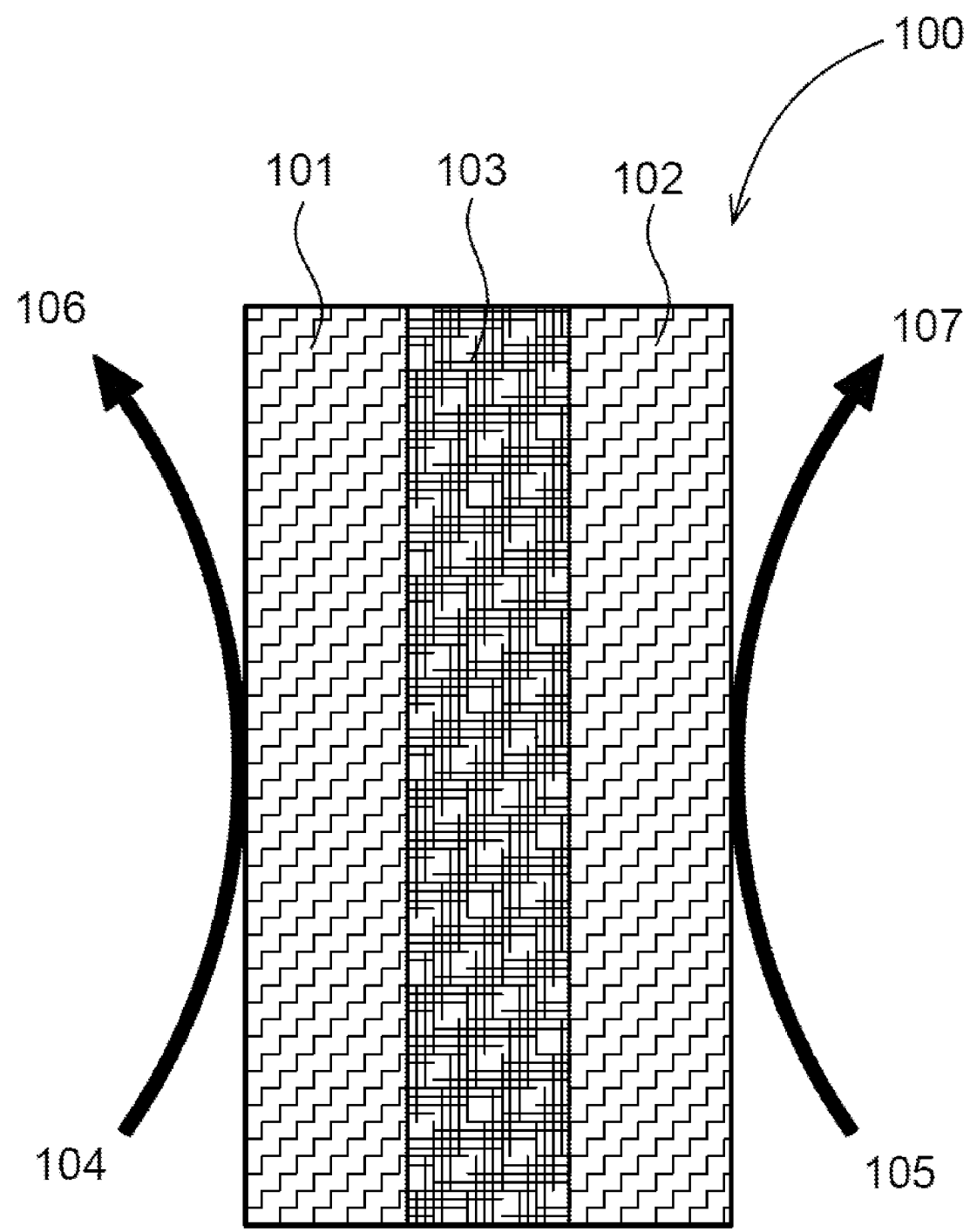
FIG. 1 illustrates an electrochemical reactor or an electrochemical (EC) gas producer, according to an embodiment of this disclosure.

The disclosure herein describes an electrochemical WGS reactor and methods of use. In particular, this disclosure also discusses methods and systems for hydrogen production. Various components of the reactor are described such as electrodes and membranes along with materials of construction of the components. The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art.

In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

In this disclosure, no substantial amount of $H_2$ means that the volume content of the hydrogen is no greater than 5%, or no greater than 3%, or no greater than 2%, or no greater than 1%, or no greater than 0.5%, or no greater than 0.1%, or no greater than 0.05%.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula Gd:CeO2). CGO and GDC are used interchangeably unless otherwise specified. Syngas (i.e., synthesis gas) in this disclosure refers to a mixture consisting primarily of hydrogen, carbon monoxide and carbon dioxide.

As used herein, ceria refers to cerium oxide, also known as ceric oxide, ceric dioxide, or cerium dioxide, is an oxide of the rare-earth metal cerium. Doped ceria refers to ceria doped with other elements, such as samaria-doped ceria (SDC), or gadolinium-doped ceria (GDC or CGO). As used herein, chromite refers to chromium oxides, which includes all the oxidation states of chromium oxides.

A layer or substance being impermeable as used herein refers to it being impermeable to fluid flow. For example, an impermeable layer or substance has a permeability of less than 1 micro darcy, or less than 1 nano darcy.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece.

Electrochemistry is the branch of physical chemistry concerned with the relationship between electrical potential, as a measurable and quantitative phenomenon, and identifiable chemical change, with either electrical potential as an outcome of a particular chemical change, or vice versa. These reactions involve electrons moving between electrodes via an electronically-conducting phase (typically, but not necessarily, an external electrical circuit), separated by an ionically-conducting and electronically insulating membrane (or ionic species in a solution). When a chemical reaction is effected by a potential difference, as in electrolysis, or if electrical potential results from a chemical reaction as in a battery or fuel cell, it is called an electrochemical reaction. Unlike chemical reactions, in electrochemical reactions electrons (and necessarily resulting ions), are not transferred directly between molecules, but via the aforementioned electronically-conducting and ionically-conducting circuits, respectively. This phenomenon is what distinguishes an electrochemical reaction from a chemical reaction.

Contrary to conventional practice, an electrochemical reactor has been discovered, which comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. This is different from water gas shift reactions via chemical pathways because chemical water gas shift reactions involve direct combination of reactants.

In an embodiment, the reactor comprises porous electrodes that comprise metallic phase and ceramic phase, wherein the metallic phase is electronically conductive and wherein the ceramic phase is ionically conductive. In various embodiments, the electrodes have no current collector attached to them. In various embodiments, the reactor does not contain any current collector. Clearly, such a reactor is fundamentally different from any electrolysis device or fuel cell.

In an embodiment, one of the electrodes in the reactor is an anode that is configured to be exposed to a reducing environment while performing oxidation reactions electrochemically. In various embodiments, the electrodes comprise Ni or NiO and a material selected from the group consisting of YSZ, CGO, SDC, SSZ, LSGM, and combinations thereof.

The electrochemical water gas shift reactions taking place in the reactor comprise electrochemical half-cell reactions, wherein the half-cell reactions are:

$$CO_{(gas)} + O^{2-} \rightleftharpoons CO_{2(gas)} + 2e^-$$ 1.

$$H_2O_{(gas)} + 2e^- \rightleftharpoons H_{2(gas)} + O^{2-}$$ 2.

In various embodiments, the half-cell reactions take place at triple phase boundaries, wherein the triple phase boundaries are the intersections of pores with the electronically conducting phase and the ionically conducting phase. Furthermore, the reactor is also capable of performing chemical water gas shift reactions.

In various embodiments, the ionically conducting membrane conducts protons or oxide ions. In various embodiments, the ionically conducting membrane comprises solid oxide. In various embodiments, the ionically conducting membrane is impermeable to fluid flow. In various embodiments, the ionically conducting membrane also conducts electrons and wherein the reactor comprises no interconnect.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, or combinations thereof.

Also discussed herein is a reactor comprising a bi-functional layer and a mixed conducting membrane; wherein the bi-functional layer and the mixed conducting membrane are in contact with each other, and wherein the bi-functional layer catalyzes reverse-water-gas-shift (RWGS) reaction and functions as an anode in an electrochemical reaction. In an embodiment, the bi-functional layer as the anode is exposed to a reducing environment and the electrochemical reaction taking place in the bi-functional layer is oxidation. In an embodiment, no current collector is attached to the bi-functional layer. In an embodiment, the bi-functional layer comprises Ni or NiO and a material selected from the group consisting of YSZ, CGO, SDC, SSZ, LSGM, and combinations thereof.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, or combinations thereof. In various embodiments, the reactor comprises no interconnect.

Such a reactor has various applications. In an embodiment, the reactor is utilized to produce carbon monoxide via hydrogenation of carbon dioxide. In another embodiment, the reactor is used to adjust syngas composition (i.e., $H_2/CO$ ratio) by converting $H_2$ to CO or converting CO to $H_2$. The following discussion takes hydrogen production as an example, but the application of the reactor is not limited to only hydrogen production.

Electrochemical Reactor

FIG. 1 illustrates an electrochemical reactor or an electrochemical (EC) gas producer 100, according to an embodiment of this disclosure. EC gas producer device 100 comprises first electrode 101, membrane 103 a second electrode 102. First electrode 101 (also referred to as anode or bi-functional layer) is configured to receive a fuel 104. Stream 104 contains no oxygen. Second electrode 102 is configured to receive water (e.g., steam) as denoted by 105.

In an embodiment, device 100 is configured to receive CO, i.e., carbon monoxide (104) and to generate $CO/CO_2$ (106) at the first electrode (101); device 100 is also configured to receive water or steam (105) and to generate hydrogen (107) at the second electrode (102). In some cases, the second electrode receives a mixture of steam and hydrogen. Since water provides the oxide ion (which is transported through the membrane) needed to oxidize the CO at the opposite electrode, water is considered the oxidant in this scenario. As such, the first electrode 101 is performing oxidation reactions in a reducing environment. In various embodiments, 103 represents an oxide ion conducting membrane. In an embodiment, the first electrode 101 and the second electrode 102 may comprise Ni—YSZ or NiO—YSZ. In an embodiment, the oxide ion conducting membrane 103 also conducts electrons.

In an embodiment, device 100 is configured to simultaneously produce hydrogen 107 from the second electrode 102 and syngas 106 from the first electrode 101. In an embodiment, 104 represents methane and water or methane and carbon dioxide entering device 100. In other embodiments, 103 represents an oxide ion conducting membrane. In an embodiment, first electrode 101 and second electrode 102 may comprise Ni—YSZ or NiO—YSZ. Arrow 104 represents an influx of hydrocarbon and water or hydrocarbon and carbon dioxide. Arrow 105 represents an influx of water or water and hydrogen. In some embodiments, electrode 101 comprises Cu-CGO, or further optionally comprises CuO or $Cu_2O$ or combination thereof. Electrode 102 comprises Ni—YSZ or NiO—YSZ. Arrow 104 represents an influx of hydrocarbon with little to no water, with no carbon dioxide, and with no oxygen, and 105 represents an influx of water or water and hydrogen. Since water provides the oxide ion (which is transported through the membrane) needed to oxidize the hydrocarbon/fuel at the opposite electrode, water is considered the oxidant in this scenario.

In this disclosure, no oxygen means there is no oxygen present at first electrode 101 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 102 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, first electrode 101 is configured to receive methane and water or methane and carbon dioxide. In an embodiment, the fuel comprises a hydrocarbon having a carbon number in the range of 1-12, 1-10 or 1-8. Most preferably, the fuel is methane or natural gas, which is predominantly methane. In an embodiment, the device does not generate electricity and is not a fuel cell.

In various embodiments, the device does not contain a current collector. In an embodiment, the device comprises no interconnect. There is no need for electricity and such a device is not an electrolyser. The membrane 103 is configured to conduct electrons and as such is mixed conducting, i.e., both electronically conductive and ionically conductive. In an embodiment, the membrane 103 conducts oxide ions and electrons. In an embodiment, the electrodes 101, 102 and the membrane 103 are tubular (see, e.g., FIGS. 2A and 2B). In an embodiment, the electrodes 101, 102 and the membrane 103 are planar. In these embodiments, the electrochemical reactions at the anode and the cathode are spontaneous without the need to apply potential/electricity to the reactor.

In an embodiment, the electrochemical reactor (or EC gas producer) is a device comprising a first electrode, a second electrode, and a membrane between the electrodes, wherein the first electrode and the second electrode comprise a metallic phase that does not contain a platinum group metal when the device is in use, and wherein the membrane is oxide ion conducting. In an embodiment, wherein the first electrode comprises Ni or NiO and a material selected from the group consisting of YSZ, CGO, samaria-doped ceria (SDC), scandia-stabilized zirconia (SSZ), LSGM, and combinations thereof. In an embodiment, the first electrode is configured to receive a fuel. In an embodiment, said fuel comprises a hydrocarbon or hydrogen or carbon monoxide or combinations thereof.

In an embodiment, the second electrode comprises Ni or NiO and a material selected from the group consisting of yttria-stabilized zirconia (YSZ), ceria gadolinium oxide (CGO), samaria-doped ceria (SDC), scandia-stabilized zirconia (SSZ), lanthanum strontium gallate magnesite (LSGM), and combinations thereof. In an embodiment, the second electrode is configured to receive water and hydrogen and configured to reduce the water to hydrogen. In various embodiments, such reduction takes place electrochemically.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, or combinations thereof.

In an embodiment, the membrane comprises gadolinium doped ceria, samarium doped ceria, a sintering aid, or combinations thereof. In various embodiments, the sintering aid comprises di-valent or tri-valent transition metal ions or combinations thereof. In an embodiment, the metal ions are oxides. In an embodiment, the transition metal comprises Co, Mn, Fe, Cu, or combinations thereof. In an embodiment, the membrane comprises CGO. In an embodiment, the membrane comprises cobalt doped CGO (CoCGO). In an embodiment, the membrane consists essentially of CGO. In an embodiment, the membrane consists of CGO. In an embodiment, the membrane consists essentially of CoCGO. In an embodiment, the membrane consists of CoCGO.

Figure 2A:
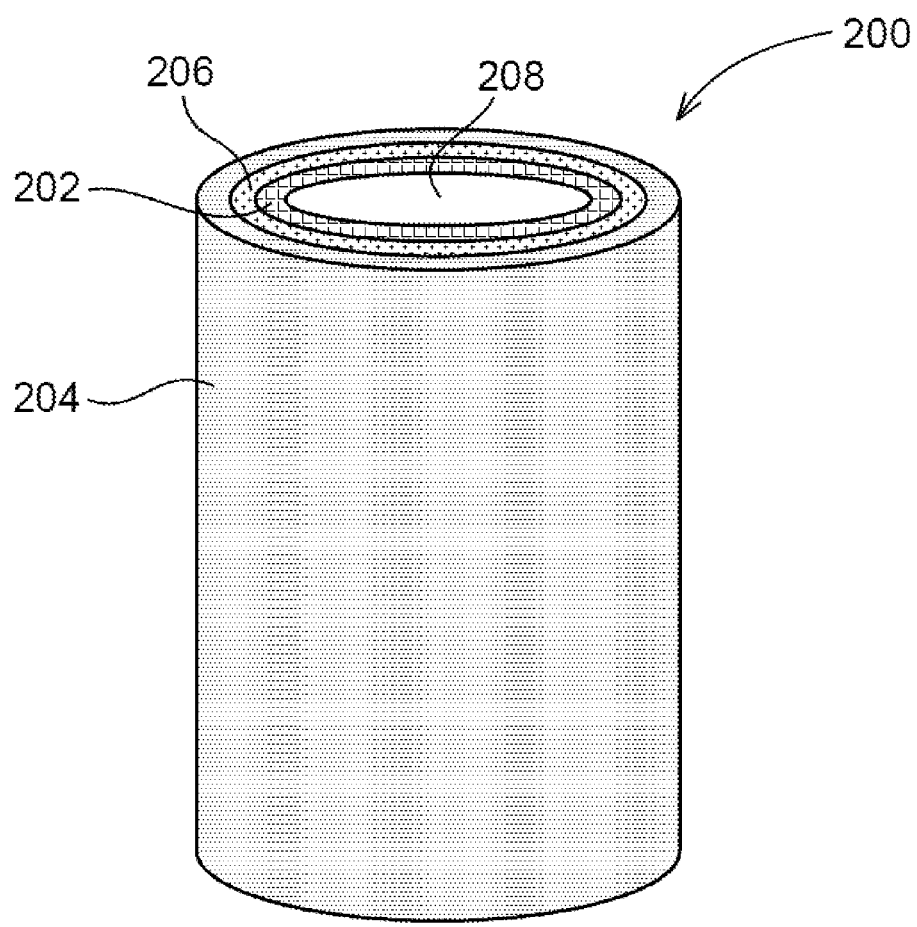
FIG. 2A illustrates a tubular electrochemical reactor, according to an embodiment of this disclosure.
Figure 2B:
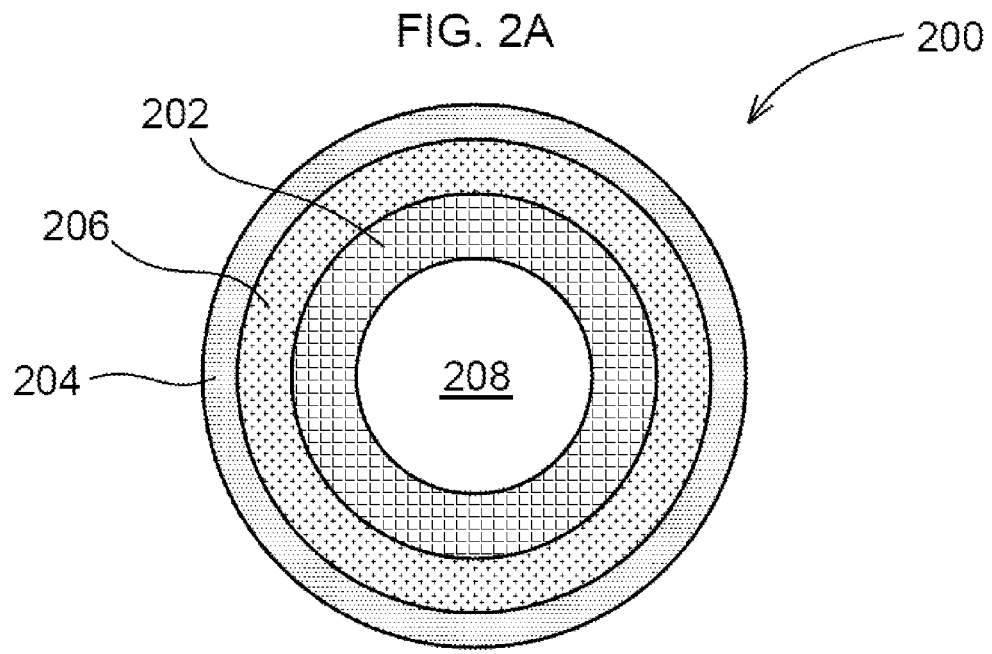
FIG. 2B illustrates a cross section of a tubular electrochemical reactor, according to an embodiment of this disclosure.

FIG. 2A illustrates (not to scale) a tubular electrochemical (EC) reactor or an EC gas producer 200, according to an embodiment of this disclosure. Tubular producer 200 includes an inner tubular structure 202, an outer tubular structure 204, and a membrane 206 disposed between the inner and outer tubular structures 202, 204, respectively. Tubular producer 200 further includes a void space 208 for fluid passage. FIG. 2B illustrates (not to scale) a cross section of a tubular producer 200, according to an embodiment of this disclosure. Tubular producer 200 includes a first inner tubular structure 202, a second outer tubular structure 204, and a membrane 206 between the inner and outer tubular structures 202, 204. Tubular producer 200 further includes a void space 208 for fluid passage.

In an embodiment, the electrodes and the membrane are tubular with the first electrode being outermost and the second electrode being innermost, wherein the second electrode is configured to receive water and hydrogen. In an embodiment, the electrodes and the membrane are tubular with the first electrode being innermost and the second electrode being outermost, wherein the second electrode is configured to receive water and hydrogen. In an embodiment, the electrodes and the membrane are tubular, wherein the first and second electrodes comprise Ni—YSZ or NiO—YSZ.

In an embodiment, the reactor comprises a catalyst that promotes chemical reverse water gas shift (RWGS) reactions. In an embodiment, the catalyst is a high temperature RWGS catalyst. In an embodiment, the catalyst is part of an anode in the reactor. In an embodiment, the catalyst is configured to be outside of the anode. For example, Ni—$Al_2O_3$ pellets as such a catalyst are placed in the reactor surrounding the tubes as shown in FIG. 2A and FIG. 2B. In an embodiment, the catalyst comprises Ni, Cu, Fe, Pt-group metals, or combinations thereof. In an embodiment, the catalyst comprises Pt, Cu, Rh, Ru, Fe, Ni, or combinations thereof.

Hydrogen Production System and Method

Disclosed herein is a method comprising providing a device comprising a first electrode, a second electrode, and a membrane between the electrodes, introducing a first stream to the first electrode, introducing a second stream to the second electrode, extracting hydrogen from the second electrode, wherein the first electrode and the second electrode comprise a metallic phase that does not contain a platinum group metal when the device is in use. In an embodiment, the membrane is oxide ion conducting.

In an embodiment, the device is operated at a temperature no less than 500° C., or no less than 600° C., or no less than 700° C., or no less than 750° C., or no less than 800° C., or no less than 850° C., or no less than 900° C., or no less than 950° C., or no less than 1000° C. In various embodiment, the pressure differential between the first electrode and the second electrode is no greater than 2 psi, or no greater than 1.5 psi, or no greater than 1 psi. In an embodiment, the first stream enters the device at a pressure of no greater than 10 psi, or no greater than 5 psi, or no greater than 3 psi. In an embodiment, the second stream enters the device at a pressure of no greater than 10 psi, or no greater than 5 psi, or no greater than 3 psi.

In an embodiment, the first stream comprises a fuel. In an embodiment, said fuel comprises a hydrocarbon or hydrogen or carbon monoxide or combinations thereof. In an embodiment, the first stream is directly introduced into the first electrode or the second stream is directly introduced into the second electrode or both. In an embodiment, the method comprises providing a reformer or a catalytic partial oxidation (CPOX) reactor upstream of the first electrode, wherein the first stream passes through the reformer or the CPOX reactor before being introduced to the first electrode, wherein the first electrode comprises Ni or NiO. In an embodiment, the reformer is a steam reformer or an autothermal reformer.

In an embodiment, the first stream comprises a fuel. In an embodiment, the fuel comprises a hydrocarbon or hydrogen or carbon monoxide or combinations thereof. In an embodiment, the second stream consists of water and hydrogen. In an embodiment, said first stream comprises carbon monoxide and no significant amount of hydrogen or hydrocarbon or water. In such cases, an upstream reformer is not needed. In this disclosure, no significant amount of hydrogen or hydrocarbon or water means that the volume content of the hydrogen or hydrocarbon or water is no greater than 5%, or no greater than 3%, or no greater than 2%, or no greater than 1%, or no greater than 0.5%, or no greater than 0.1%, or no greater than 0.05%.

In various embodiments, the first stream comprises no less than 50% of CO by volume, or no less than 60% of CO by volume, or no less than 70% of CO by volume, or no less than 80% of CO by volume, or no less than 90% of CO by volume. In an embodiment, the first stream comprises $CO_2$. In an embodiment, the first stream comprises syngas (CO and $H_2$). In an embodiment, the first stream comprises inert gases like argon or nitrogen. In an embodiment, the second stream consists of water and hydrogen.

In an embodiment, the method comprises using the extracted hydrogen in one of Fischer-Tropsch (FT) reactions, dry reforming reactions, Sabatier reaction catalyzed by nickel, Bosch reaction, reverse water gas shift reaction, electrochemical reaction to produce electricity, production of ammonia, production of fertilizer, electrochemical compressor for hydrogen storage, fueling hydrogen vehicles or hydrogenation reactions or combinations thereof.

Herein disclosed is a method of producing hydrogen comprising providing an electrochemical reactor, introducing a first stream comprising a fuel to the device, introducing a second stream comprising water to the device, reducing the water in the second stream to hydrogen, and extracting hydrogen from the device, wherein the first stream and the second stream do not come in contact with each other in the device. In various embodiments, the reduction from water to hydrogen takes place electrochemically. In an embodiment, the first stream does not come in contact with the hydrogen. In an embodiment, the first stream and the second stream are separated by a membrane in the device.

In an embodiment, the fuel comprises a hydrocarbon or hydrogen or carbon monoxide or combinations thereof. In an embodiment, the second stream comprises hydrogen. In an embodiment, the first stream comprises the fuel. In an embodiment, the fuel consists of carbon monoxide. In an embodiment, the first stream consists of carbon monoxide and carbon dioxide. In an embodiment, the second stream consists of water and hydrogen. In an embodiment, the second stream consists of steam and hydrogen.

Figure 3A:
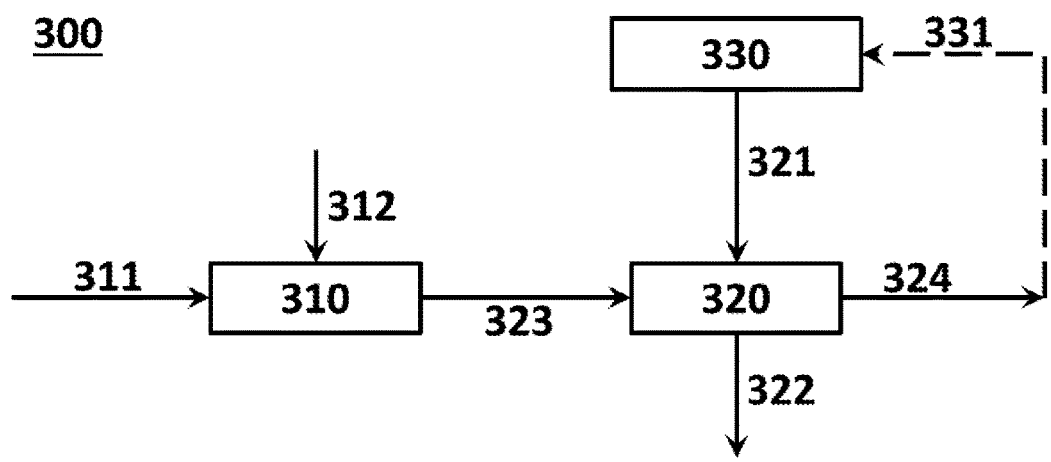
FIG. 3A illustrates a hydrogen production system, according to an embodiment of this disclosure.

As illustrated in FIG. 3A, a hydrogen production system 300 is shown. The system comprises a catalytic partial oxidation (CPOX) reactor 310; a steam generator 330; and an electrochemical (EC) reactor 320; wherein the CPOX reactor product stream 323 is introduced into the EC reactor and the steam generator provides steam 321 to the EC reactor; and wherein the product stream 323 and the steam 321 do not come in contact with each other in the EC reactor. The CPOX reactor product stream 323 is used as a fuel in the EC reactor 320. The CPOX reactor 310 takes in stream 311 having a hydrocarbon (e.g., methane, ethane, propane, gasoline, jet fuel, etc.) and oxidizes the hydrocarbon to product syngas, $CO_2$, and water, etc. Because the EC reactor is able to carry out the intended reactions efficiently in the presence of gases such as nitrogen, argon, carbon dioxide, there is no need for gas separation between the CPOX reactor and the EC reactor. Also, this enables the CPOX reactor to utilize air 312 as the oxidant. Of course, purified oxygen could always be used in the CPOX reactor but using air directly provides substantial savings both in capital equipment cost and operational cost.

In an embodiment, the EC reactor 320 comprises a catalyst that promotes chemical reverse water gas shift (RWGS) reactions. In an embodiment, the catalyst is a high temperature RWGS catalyst. In an embodiment, the catalyst is part of an anode in the reactor. In an embodiment, the catalyst is configured to be outside of the anode. For example, Ni—$Al_2O_3$ pellets as such a catalyst are placed in the reactor surrounding the tubes as shown in FIG. 2A and FIG. 2B. In an embodiment, the catalyst comprises Ni, Cu, Fe, Pt-group metals, or combinations thereof. In an embodiment, the catalyst comprises Pt, Cu, Rh, Ru, Fe, Ni, or combinations thereof.

The EC reactor 320 generates a first product stream 324 comprising CO and $CO_2$ and a second product stream 322 comprising $H_2$ and $H_2O$, wherein the two product streams do not come in contact with each other. In some cases, at least a portion of the first product stream 324 is recycled (stream 331) to enter the steam generator to provide heat to produce steam from water. In some cases, a portion of the second product stream 322 is recycled to enter the EC reactor (on the cathode side). In various embodiments, the EC reactor 320 comprises an ionically conducting membrane (not shown in FIG. 3A), which membrane along with the anode enables the reactor to perform electrochemical water gas shift reactions, wherein electrochemical water gas shift reactions involve the exchange of an ion through the membrane and include forward water gas shift reactions, or reverse water gas shift reactions, or both. The anode also enables the reactor to perform chemical water gas shift reactions.

Figure 3B:
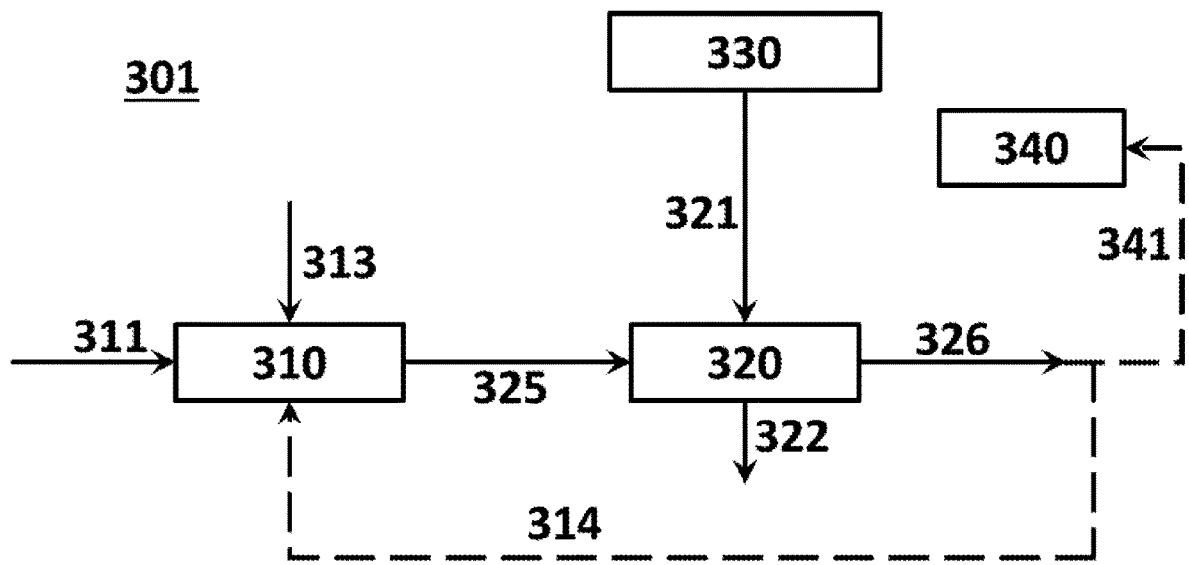
FIG. 3B illustrates an alternative hydrogen production system, according to an embodiment of this disclosure.

As shown in FIG. 3B, an alternative hydrogen production system 301 is shown. In this embodiment, the CPOX reactor 310 utilizes oxygen 313 as the oxidant and as such there is little or minimal amount of nitrogen present. The product stream 325 from the CPOX reactor is sent to the EC reactor and oxidized at the anode and exits the EC reactor as anode exhaust 326, a portion of which (stream 314) is recycled to the CPOX reactor, and optionally a portion of which (stream 341) is sent to a carbon capture unit 340 to sequester $CO_2$.

As such, hydrogen is produced via a method comprising: introducing a hydrocarbon into a catalytic partial oxidation (CPOX) reactor to generate a product stream; providing said product stream and steam to an electrochemical (EC) reactor, wherein the product stream and the steam do not come in contact with each other in the EC reactor. The EC reactor comprises an ionically conducting membrane, wherein the reactor is capable of performing the water gas shift reactions electrochemically, wherein electrochemical water gas shift reactions involve the exchange of an ion through the membrane and include forward water gas shift reactions, or reverse water gas shift reactions, or both. Furthermore, the membrane separates the product stream from the steam. In various embodiment, the pressure differential between the product stream side and the steam side is no greater than 2 psi, or no greater than 1.5 psi, or no greater than 1 psi.

In various embodiments, the CPOX reactor utilizes air as the oxidant. In various embodiments, the CPOX reactor product stream enters the EC reactor directly with no gas separation. In various embodiments, the EC reactor oxidizes the CPOX reactor product stream in a reducing environment and generates a first product stream comprising CO and $CO_2$; and wherein the EC reactor reduces steam to hydrogen electrochemically and generates a second product stream comprising $H_2$ and $H_2O$. In various embodiments, the membrane separates the first and second product streams. In various embodiments, at least a portion of the first product stream is utilized to produce steam from water. In various embodiments, at least a portion of the second product stream is recycled to enter the EC reactor.

The steam generator produces steam from water. In an embodiment, the steam that enters the electrochemical reactor has a temperature of no less than 600° C., or no less than 700° C., or no less than 800° C., or no less than 850° C., or no less than 900° C., or no less than 950° C., or no less than 1000° C., or no less than 1100° C. In an embodiment, the steam that enters the electrochemical reactor has a pressure of no greater than 10 psi, or no greater than 5 psi, or no greater than 3 psi.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of producing hydrogen comprising:
   a. Introducing a hydrocarbon into a catalytic partial oxidation (CPOX) reactor to generate a product stream; and
   b. Providing an electrochemical (EC) reactor comprising an anode and a cathode separated by a mixed-conducting membrane,
   c. Introducing the CPOX reactor product stream to the anode of the EC reactor and introducing steam and hydrogen to the cathode of the EC reactor, wherein the anode oxidizes the product stream in a reducing environment and generates a first product stream comprising CO and $CO_2$, and simultaneously the cathode reduces steam in a reducing environment to hydrogen electrochemically and generates a second product stream comprising $H_2$ and $H_2O$.

2. The method of claim 1, wherein the reactor is capable of performing water gas shift reactions electrochemically, wherein the electrochemical water gas shift reactions involve exchange of an ion through the membrane and include forward water gas shift reactions, or reverse water gas shift reactions, or both.

3. The method of claim 1, wherein the membrane is oxide-ion conductive and electronically conductive.

4. The method of claim 1, wherein the membrane separates the product stream on the anode side from the steam and hydrogen on the cathode side.

5. The method of claim 1, wherein the EC reactor comprises a catalyst on the anode side, wherein the catalyst promotes chemical reverse water gas shift (RWGS) reactions.

6. The method of claim 1, wherein the EC reactor does not generate electricity and does not receive electricity.

7. The method of claim 1, wherein the membrane separates the first and second product streams.

8. The method of claim 1, wherein at least a portion of the second product stream is recycled to enter the EC reactor.

9. The method of claim 1, wherein the CPOX reactor utilizes air as the oxidant and wherein optionally the CPOX reactor product stream enters the EC reactor directly with no gas separation.

10. The method of claim 1, wherein the CPOX reactor utilizes oxygen as the oxidant and wherein optionally the CPOX reactor product stream enters the EC reactor directly with no gas separation.

11. The method of claim 1, wherein at least a portion of the first product stream is used to generate steam.

12. The method of claim 1, wherein at least a portion of the first product stream is recycled to the CPOX reactor.

13. The method of claim 1, wherein at least a portion of the first product stream is sent to a carbon capture unit.

14. The method of claim 1, wherein the membrane is gas tight.

15. The method of claim 1, wherein the EC reactor comprises no interconnect.

\* \* \* \* \*